United States Patent [19]

Houle

[11] Patent Number: 4,699,265

[45] Date of Patent: Oct. 13, 1987

[54] CONVEYOR SYSTEM FOR USE WITH AN INGREDIENT MIXER

[75] Inventor: Mario Houle, Wickham, Canada

[73] Assignee: Agrimetal Inc., Wickham, Canada

[21] Appl. No.: 883,824

[22] Filed: Jul. 9, 1986

[51] Int. Cl.[4] ............................................. B65G 33/36
[52] U.S. Cl. ................................. 198/575; 198/550.1; 198/675; 74/435; 74/437
[58] Field of Search ................. 198/550.1, 550.6, 545, 198/548, 575, 625, 670, 674, 675; 74/84 R, 415, 435, 436, 437

[56] References Cited

U.S. PATENT DOCUMENTS

| | | | |
|---|---|---|---|
| 2,496,764 | 2/1950 | Whitney | 198/670 |
| 3,313,398 | 4/1967 | Andrews | 198/675 X |
| 3,661,028 | 5/1972 | Fuchs | 74/415 |
| 3,782,210 | 1/1974 | Holleman | 74/415 X |
| 4,093,036 | 6/1978 | Knutson | 74/415 X |
| 4,602,527 | 7/1986 | Tamiya | 74/437 X |

OTHER PUBLICATIONS

Design and Development/Scanning the Fields for Ideas-vol. 34, No. 21, p. 182, Sep. 13, 1962.
Automatic Roller Mills, advertising brochure of Automatic Equipment Manufacturing Co. of Pender, Nebraska, 1983.
Farmatic High Tech Feed Processing for Increased Profitability, advertising brochure of Farmatic Inc. of London, Ontario, 1984.

*Primary Examiner*—Robert Spar
*Assistant Examiner*—Lyle Kim

[57] ABSTRACT

A conveyor system for use with rotary screw conveyors located side by side has a mechanical arrangement allowing individually adjusting the speed of each conveyor. One end of each conveyor has driven teeth disposed in a circle and coaxial with the rotation axis of the conveyor. Each conveyor is rotated by a circular disk rotating about an axis normal to the axis of the conveyor and provided with driving teeth disposed in a circle on the disk and positioned to mesh with the driven teeth of the conveyor. The driving teeth of each disk are individually mounted so that they may be moved between a working position where they mesh with the companion conveyor driven teeth and a non-working position where they are retracted wholly within the disk. By thus retracting some of the disk teeth, the rotation of the companion conveyor may be step-like, thus controlling its conveying capacity.

10 Claims, 5 Drawing Figures

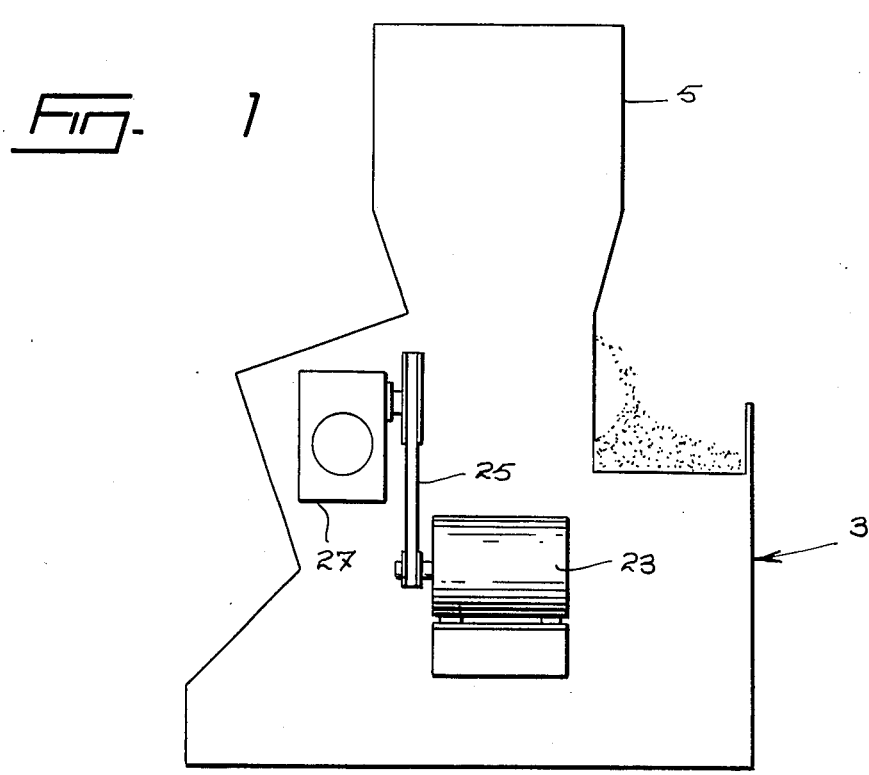
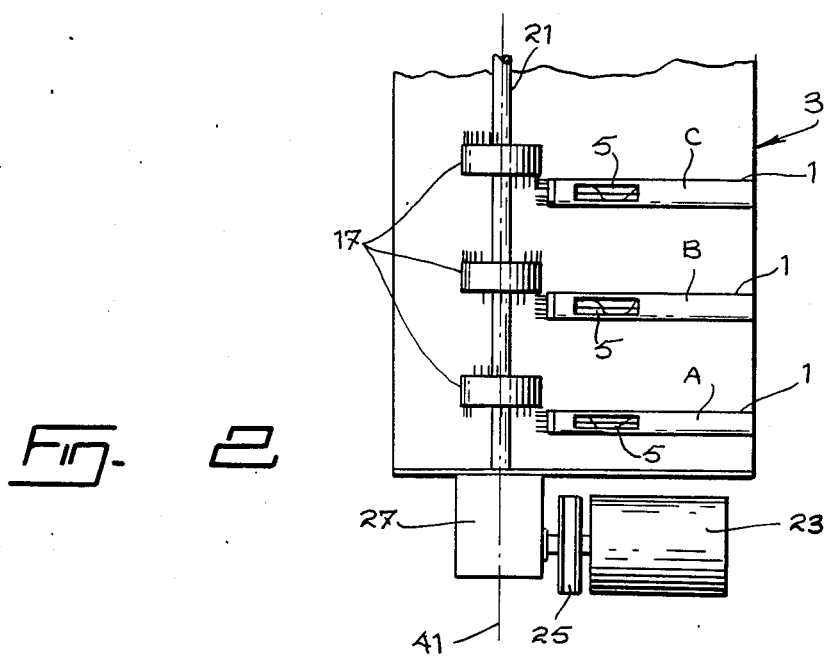

CONVEYOR SYSTEM FOR USE WITH AN INGREDIENT MIXER

BACKGROUND OF THE INVENTION

Field of the invention

The present invention generally relates to an ingredient dosing apparatus and more specifically to a conveyor system for individually supplying the various ingredients to a mixer for processing animal feed, particularly for livestock, poultry or the like.

Description of the prior art

In existing systems, each ingredient is supplied to the mixer by its individual conveyor which is usually a screw conveyor having its own hopper. As all ingredients do not go into the feed in the same proportions, it is obvious that the screw conveyors must be driven at appropriate speeds that differentiate from one another to ensure a constant supply of the right amounts of ingredients into the mixer so as to arrive at a properly balanced feed. For this purpose, each screw conveyor has its own D.C. motor provided with an adequate speed control unit in the form of an AC-DC convertor, for instance.

The above system is quite complex and costly as well as somewhat unsafe if the strength of the network current is not too reliable.

A main object of the invention lies in providing a system of the above type which is quite simpler, mainly in that it avoids having to resort to a D.C. motor and speed control unit for each conveyor. In fact, only one motor is required, according to the invention, with the further advantage that this motor may be a more conventional A.C. motor with speed control of the rotary screw conveyors being achieved wholly mechanically.

SUMMARY OF THE INVENTION

According to the invention, there is provided a conveyor system of the above type essentially comprising: elongated conveyors rotatable about parallel rotation axes and located side-by-side, each conveyor having a transverse wall at one of its ends, wherein: the transverse end wall of each conveyor has driven teeth, solid therewith, disposed in a circle coaxial with the conveyor rotation axis; each conveyor is rotated by an associate disk having a working face, the rotation of the disks being about a common axis perpendicular to the rotation axes of the conveyors with which the disks are associated, each associate disk being provided with driving teeth projecting from the working face thereof; the said driving teeth being positioned to mesh with the driven teeth of its associate conveyor; a rotary shaft on which the disks of all conveyors are secured for rotation about the disk common rotation axis; the driving teeth of each disk are mounted thereon so that they may be moved individually between a working position wherein they mesh with the driven teeth of the associated conveyor and a non-working position wherein they are retracted wholly within the disk. A description now follows of a preferred embodiment of the invention having reference to the appended drawings.

DESCRIPTION OF THE DRAWINGS

FIG. 1 is a diagrammatic end view of a feed processing mixer incorporating the conveyor system according to the invention;

FIG. 2 is a plan view of a portion of a conveyor system made according to the invention;

DESCRIPTION OF A PREFERRED EMBODIMENT

Figure 3:
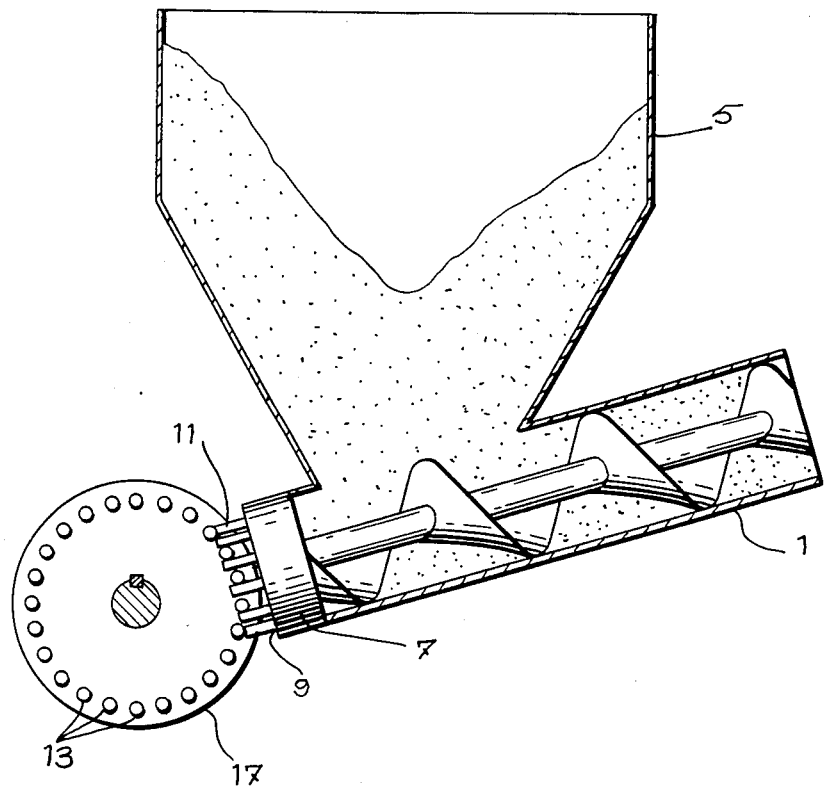
FIG. 3 is a diagrammatic end view of the conveyor system of FIG. 2.

Referring to the drawing, there is shown a conveyor system which is for use, as aforesaid, with a mixer for processing feed for livestock poultry or the like animal feed.

Figure 4:
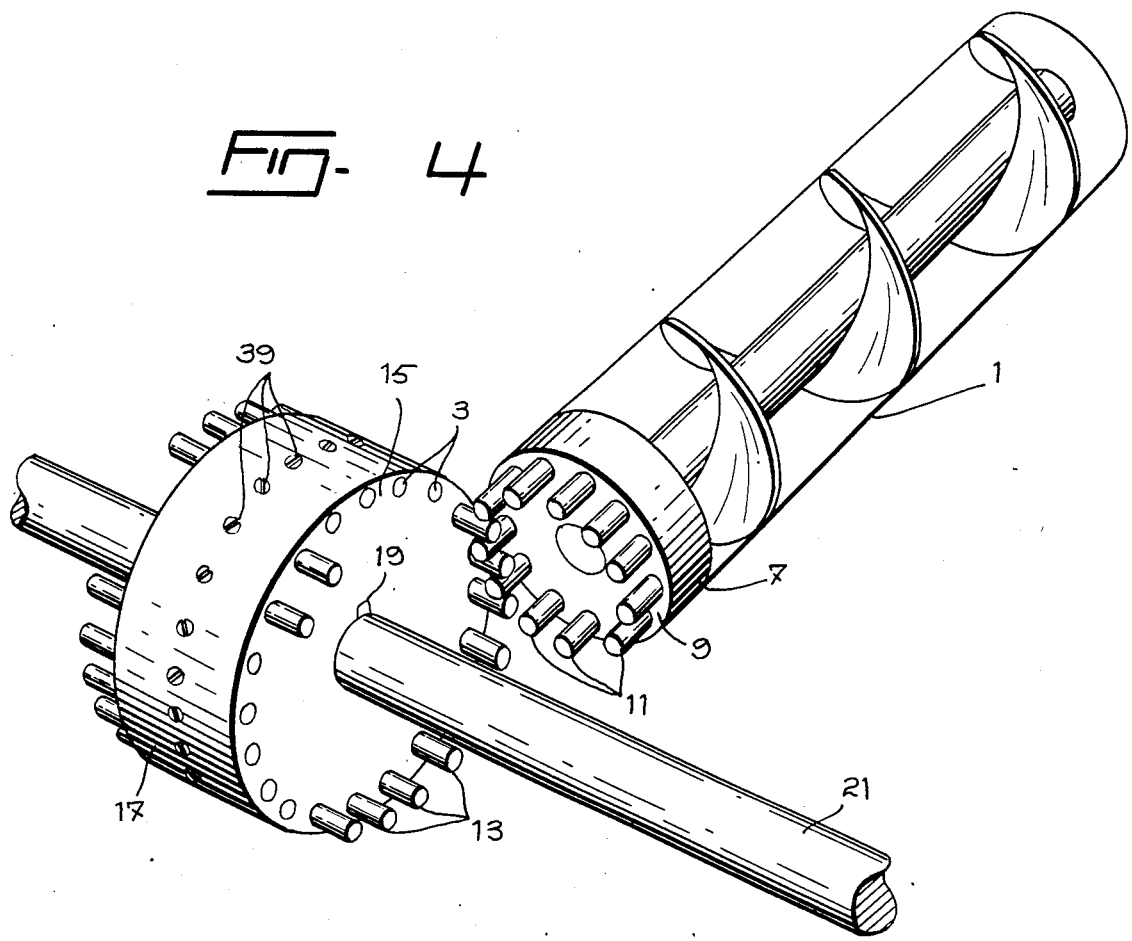
FIG. 4 is a diagrammatic perspective view of a portion of the conveyor system applied to one screw conveyor.

FIG. 2 shows a portion of such a system illustrating three rotary conveyors 1, preferably of the same size and of the same ingredient supply capacity when rotated at the same speed. They are preferably also of the screw conveyor type as shown in FIG. 4 and feed into the ingredient mixer itself (not shown) which processes the animal feed. The conveyors 1 are mounted on a frame 3 and each has its own hopper 5 supplying a particular ingredient of the animal feed. There are of course as many conveyors as there are ingredients but the ingredients are supplied to the feed processing mixer in different proportions so that the conveying capacity of the conveyors 1 vary from one conveyor to the other. The invention precisely provides, as aforesaid, a means for adjusting the supply capacity of the conveyors.

Since the conveyors 1 used in the present embodiment are all identical, only one need be described.

The conveyor 1 has a solid cylindrical rotary head 7 which defines an outward essentially flat transverse end wall 9. A plurality of equally spaced pins 11, solid with the conveyor head 7, project perpendicularly from the end wall 9 and along a circle at the periphery of the end wall 9. All pins 11 have the same dimension and will hereinafter be called driven teeth which serve to cause rotation of the conveyor 1, through its rotary head 7.

The driven teeth 11 mesh with a plurality of driving pins or teeth 13 that are equally spaced from one another and are perpendicular to the working face 15 of a drive disk 17, the driving teeth 13 being disposed along a circle at the periphery of the working face 15. It can easily be seen from FIGS. 3 and 4 that when the drive disk 17 is brought into rotation, its drive teeth 13 cause rotation of the head 7 through the cooperating driven teeth 11 thereby rotating the conveyor 1. It will also be noted from FIGS. 4 and 5 that the driving teeth 13 are mounted on the disk 17 for selective individual movement between a working position where the driving teeth 13 mesh with the driven teeth 11 and a non-working position where the driving teeth 13 are retracted completely within the disk 17.

Disk 17 is mounted solid, as by means of a spline 19, on a shaft 21 brought into rotation by a motor 23 (see FIG. 2) through a belt drive 25 and a speed reducer 27. FIG. 4 illustrates that the working face 15, extending radially of the shaft 21, lies laterally of the transverse end wall 9 of the conveyor 1 so that the driving and the driven teeth 13 and 11 appropriately mesh with one another.

Figure 5:
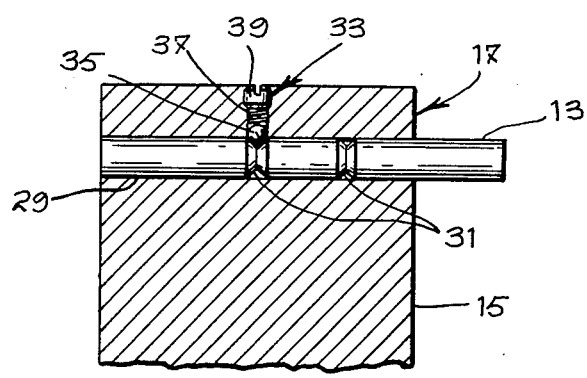
FIG. 5 is a cross-sectional view of a portion of a driving disk.

FIG. 5 clearly illustrates how the driving teeth 13 can be made to move between the working position which is that of FIG. 5 to the non-working position illustrated, for some of the driving teeth 13, in FIG. 4. For this purpose, the drive disk 17 is provided with through cylindrical bores 29, one for each the driving teeth 13, that extend parallel to the rotation axis of the shaft 21. Each pin 13 is seen to be formed with a pair of adequately spaced peripheral grooves 31. A resilient detent device 33 holds the corresponding driving tooth 13 in one of the two aforesaid working and non-working positions. The detent device may, for this purpose, be comprised of a detent ball 35 pressed into the relevant groove 31 by a spring 37 to which a pressure is applied by means of an allen screw 39 adjustable from outside the drive disk 17. Alternatively, the detent device may be comprised of a small spring and of a detent ball inserted in this order in the bottom of a blind hole radially extending from the outside the drive disk past the through-cylindrical bore 29 in which is located each driving tooth.

In such a case, the spring and ball are positioned opposite to the outside of the drive disk relative to the driving tooth and are retained inside the blind hole by said tooth, thereby making unecessary to use an allen screw. In both cases, whenever it is desired to shift the driving tooth 13 of FIG. 5 from its shown working position to its non-working position where it is moved leftward into the drive disk 17, the allen screw 39 is simply loosen to allow easy shifting of the driving tooth 13. As will be appreciated, the distance between the two grooves 31 is of course equal to the length of the driving tooth 13 that projects away from the working face 15 of the drive disk 17.

As shown in FIG. 2, all drive disks 17 are solidly mounted on the common shaft 21.

Referring to FIG. 2 and assuming, for example, that a particular type of animal feed is required wherein the ingredients are present in proportions such that when conveyor A discharges a quantity 3, conveyor B has to discharge a quantity 2 and conveyor C, a quantity 1, that is a ratio 3-2-1, then the drive disks 17 have to be adjusted as follows with respect to their driving teeth 13. In the case of conveyor A which has to discharge the aforesaid quantity 3, all driving teeth 13 would be operative, that it would project out of the corresponding working face 17. In the case of conveyor B, two thirds of the driving teeth 13 would be operative while in the case of conveyor C, one third of the driving teeth 13 would be operative, the remaining teeth being withdrawn within the drive disks 17.

In other words, by thus proceeding with the driving teeth, the conveyor A would be constantly rotating but conveyors B and C would rotate irregularly to thereby adjust their conveying capacities to that of conveyor A.

In the preferred case where all drive disks 17 are of equal diameter, the transverse end walls 9 of all conveyors 1 must of course lie in a common plane, as shown in FIG. 2, which is parallel to the axis 41 of the shaft 21.

I claim:

1. A conveyor system comprising: elongated conveyors rotatable about parallel rotation axes and located side-by-side, each conveyor having a transverse wall at one of its ends, wherein:

the transverse end wall of each conveyor has driven teeth, disposed in a circle and aligned with the conveyor rotation axis;

each conveyor is rotated by an associate disk having a working face, the rotation of the disks being about a common axis perpendicular to the rotation axes of the conveyors with which the disks are associated, each associate disk being provided with driving teeth projecting from the working face thereof; said driving teeth being positioned to mesh with the driven teeth of its associate conveyor;

a rotary shaft on which the disks of all conveyors are secured for rotation about the disk common rotation axis;

the driving teeth of each disk are mounted thereon so that they may be moved individually between a working position wherein they mesh with the driven teeth of the associated conveyor and a non-working position wherein they are retracted wholly within the disk whereby rotation of said conveyors may be made irregular by having some of said driving teeth in one of said positions and the remaining driving teeth in the other position thereby controlling the rotation of said conveyors.

2. A conveyor system for use in a mixer for processing feed for livestock, poultry or the like animal feed, said system comprising:

a plurality of rotary conveyors rotatable about parallel axes, each conveyor having a head at one end defining a transverse end wall;

a plurality of equally spaced teeth projecting substantially along the direction of the conveyor rotation axis from each end wall and disposed in a circle on said end wall;

a common drive shaft extending perpendicular to said rotary conveyor parallel axes and adjacent said conveyor heads;

drive disks equal in number to the number of said conveyors, each disk having a working face;

means solidly mounting said disks on said drive shaft with each of said working faces lying laterally of one of said conveyor head end walls to cooperate therewith;

a plurality of equally spaced teeth projecting perpendicularly from each said working face and disposed in a circle, the teeth of each of said working faces meshing with the teeth of the conveyor head end wall for rotating said conveyors and means mounting the teeth on said each disks for selective individual movement between a working position wherein the disk teeth mesh with the head teeth and a non-working position wherein said disk teeth are retracted completely within said disks, whereby rotation of said conveyors may be made irregular by having some of said disk teeth in one of said positions and the remaining disk teeth in the other position thereby controlling the rotation of said conveyors.

3. A conveyor system as claimed in claim 2, wherein each disk is provided with through cylindrical bores extending parallel to said common drive shaft and have a predetermined thickness, said disk teeth are cylindrical pins slidably displaceable into said bores and are formed with a pair of peripheral grooves therealong, and wherein said disk teeth mounting means comprise resilient detent means operable from outside of said disk and including a ball detent engageable selectively in one of said grooves, said cylindrical pins have a length exceeding the thickness of said disk.

4. A conveyor system as claimed in claim 3, wherein said head teeth are cylindrical pins and the spacing between said head pins and said disk pins, when said disk pins project out of said bores, is essentially equal for proper meshing of said pins.

5. A conveyor system as claimed in claim 4, wherein each of said rotary conveyors is a screw conveyor and further including a hopper for discharging feed ingredients into said conveyor.

6. A conveyor system as claimed in claim 2, wherein said teeth circles on said conveyor heads are of equal diameters and said head teeth are equal in number along said head circles.

7. A conveyor system as claimed in claim 6, wherein said rotary conveyors all have the same conveying capacity when rotated at the same speed.

8. A conveyor system as claimed in claim 7, wherein said teeth circles on said disks are of equal diameter and said disk teeth are equal in number along said teeth circles.

9. A conveyor system as claimed in claim 1, wherein said conveyor transverse end walls lie in a common plane.

10. A conveyor system as claimed in claim 2, wherein said conveyor transverse end walls lie in a common plane.

* * * * *